United States Patent
Pope et al.

(10) Patent No.: US 10,104,005 B2
(45) Date of Patent: Oct. 16, 2018

(54) DATA BUFFERING

(71) Applicant: Solarflare Communications, Inc., Irvine, CA (US)

(72) Inventors: Steven Leslie Pope, Cambridge (GB); David James Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 943 days.

(21) Appl. No.: 13/644,433

(22) Filed: Oct. 4, 2012

(65) Prior Publication Data

US 2013/0121183 A1    May 16, 2013

Related U.S. Application Data

(63) Continuation of application No. 12/215,437, filed on Jun. 26, 2008, now Pat. No. 8,286,193, which is a
(Continued)

(30) Foreign Application Priority Data

Feb. 1, 2006    (GB) .................................. 0602033.3

(51) Int. Cl.
  *G06F 15/16*    (2006.01)
  *H04L 12/863*   (2013.01)
  (Continued)

(52) U.S. Cl.
  CPC .......... *H04L 47/62* (2013.01); *G06F 9/45533* (2013.01); *G06F 9/544* (2013.01);
  (Continued)

(58) Field of Classification Search
  CPC .. H04L 69/22; H04L 2012/5616; H04L 69/26
  (Continued)

(56) References Cited

U.S. PATENT DOCUMENTS

| 5,272,599 A | 12/1993 | Koenen |
| 5,325,532 A | 6/1994 | Crosswy et al. |

(Continued)

FOREIGN PATENT DOCUMENTS

| EP | 620521 | 3/1995 |
| EP | 2272214 | 1/2011 |

(Continued)

*Primary Examiner* — Jonathan A Bui
(74) *Attorney, Agent, or Firm* — Wolf, Greenfield & Sacks, P.C.

(57) ABSTRACT

A method is disclosed for bridging between a first data link carrying data units of a first data protocol and a second data link for carrying data units of a second protocol by means of a bridging device. This method may comprise receiving by means of a first interface entity data units of a first protocol, and storing those data units in the memory. Then, accessing by means of a protocol processing entity the protocol data of data units stored in the memory and thereby performing protocol processing for those data units under the first protocol. The method also accesses by means of a second interface entity the traffic data of data units stored in the memory and thereby transmits that traffic data over the second data link in data units of the second data protocol.

20 Claims, 3 Drawing Sheets

Related U.S. Application Data continuation of application No. PCT/GB2006/004946, filed on Dec. 28, 2006.

(51) Int. Cl.
- *G06F 9/455* (2018.01)
- *G06F 9/54* (2006.01)
- *H04L 29/06* (2006.01)
- *H04L 12/807* (2013.01)
- *H04L 12/835* (2013.01)

(52) U.S. Cl.
CPC .............. *H04L 29/06* (2013.01); *H04L 47/27* (2013.01); *H04L 47/30* (2013.01); *H04L 69/16* (2013.01)

(58) Field of Classification Search
USPC .................. 709/201, 217, 218, 219, 246
See application file for complete search history.

(56) References Cited

U.S. PATENT DOCUMENTS

| | | |
|---|---|---|
| 5,946,189 A | 8/1999 | Koenen et al. |
| 6,006,289 A * | 12/1999 | James ............... G06F 13/4059 370/431 |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,785,892 B1 * | 8/2004 | Miller ............... G06F 15/167 712/203 |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,466,703 B1 * | 12/2008 | Arunachalam ......... H04L 45/00 370/351 |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2001/0054131 A1 * | 12/2001 | Alvarez, II ............ H03M 7/30 711/105 |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2002/0172195 A1 * | 11/2002 | Pekkala ............... H04L 49/103 370/360 |
| 2003/0007165 A1 | 1/2003 | Hudson |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0093541 A1 * | 5/2003 | Lolayekar ........... H04L 67/1097 709/230 |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0071250 A1 | 4/2004 | Bunton et al. |
| 2004/0120340 A1 * | 6/2004 | Furey ..................... H04L 69/22 370/429 |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0091358 A1 * | 4/2005 | Mehra ................. H04L 49/351 709/223 |
| 2005/0108434 A1 * | 5/2005 | Witchey ............... H04L 69/08 709/246 |
| 2005/0135397 A1 * | 6/2005 | Hoban ................. H04L 45/60 370/428 |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0168247 A1 * | 7/2006 | Hunneyball ........ H04L 29/1216 709/228 |
| 2006/0193318 A1 | 8/2006 | Narasimhan et al. |
| 2006/0228637 A1 | 10/2006 | Jackson et al. |
| 2006/0235977 A1 * | 10/2006 | Wunderlich ........ H04L 67/1097 709/227 |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |

(56) References Cited

U.S. PATENT DOCUMENTS

| | | | |
|---|---|---|---|
| 2008/0109523 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smelloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | | |
|---|---|---|---|
| GB | 2372679 A * | 8/2002 | ............. H04L 29/06 |
| WO | 2001048972 | 7/2001 | |
| WO | 2002035838 | 5/2002 | |
| WO | 2008127672 | 12/2008 | |
| WO | 2009136933 | 11/2009 | |
| WO | 2010020907 | 7/2010 | |
| WO | 2010087826 | 8/2010 | |
| WO | 2011043768 | 4/2011 | |
| WO | 2011053305 | 5/2011 | |
| WO | 2011053330 | 5/2011 | |

* cited by examiner

DATA BUFFERING

PRIORITY CLAIM

This application is a continuation of and claims priority to U.S. patent application Ser. No. 12/215,437 filed Jun. 26, 2008, which is a continuation of and claims priority to PCT Application No. PCT/GB2006/004946 filed on Dec. 28, 2006 which claims priority to Great Britain Application No. 0602033.3 filed on Feb. 1, 2006.

FIELD OF THE INVENTION

This invention relates to the buffering of data, for example in the processing of data units in a device bridging between two data protocols.

BACKGROUND OF THE INVENTION

Figure 1:
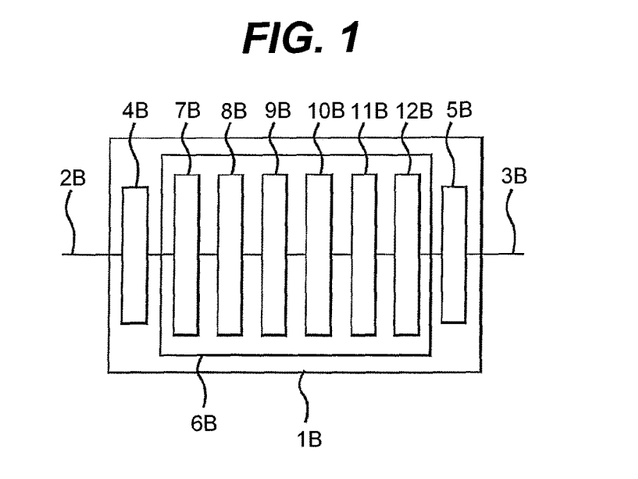
FIG. 1 shows in outline the logical and physical architecture of a bridge.

FIG. 1 shows in outline the logical and physical architecture of a bridge 1 for bridging between data links 2 and 3. In this example link 2 carries data according to the Fibrechannel protocol and link 3 carries data according to the ISCSI (Internet Small Computer Serial Interface) protocol over the Ethernet protocol (known as ISCSI-over-Ethernet). The bridge comprises a Fibrechannel hardware interface 4, an Ethernet hardware interface 5 and a data processing section 6. The interfaces link the data processing section to the respective data links 2 and 3. The data processing section implements a series of logical protocol layers: a Fibrechannel driver 7, a Fibrechannel stack 8, a bridge/buffer cache 9, an ISCSI stack 10, a TCP (transmission control protocol) stack 11 and an Ethernet driver 12. These layers convert packets that have been received in accordance with one of the protocols into packets for transmission according to the other of the protocols, and buffer the packets as necessary to accommodate flow control over the links.

Figure 2:
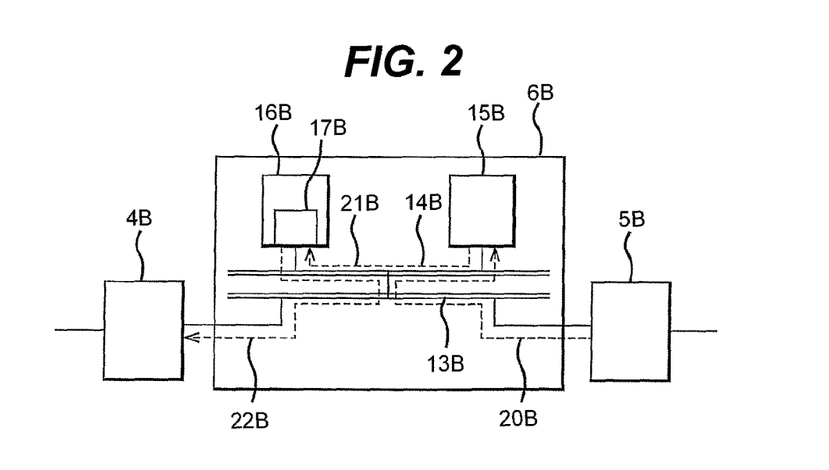
FIG. 2 shows the architecture of the bridge of FIG. 1 in more detail, illustrating data transfer steps.

FIG. 2 shows the physical architecture of the data processing section 6. The data processing section 6 comprises a data bus 13, such as a PCI (personal computer interface) bus. Connected to the data bus 13 are the Ethernet hardware interface 5, the Fibrechannel hardware interface 4 and the memory bus 14. Connected to the memory bus 14 are a memory unit 15, such as a RAM (random access memory) chip, and a CPU (central processing unit) 16 which has an integral cache 17.

Figure 3:
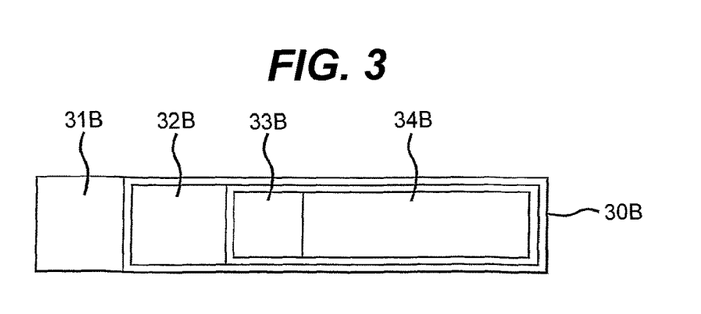
FIG. 3 shows the structure of an ISCSI-over-Ethernet packet.

The example of an ISCSI-over-Ethernet packet being received and translated to Fibrechannel will be discussed, in order to explain problems of the prior art. The structure of the Ethernet packet is shown in FIG. 3. The packet 30 comprises an Ethernet header 31, a TCP header 32, an ISCSI header 33 and ISCSI traffic data 34.

Arrows 20 to 22 in FIG. 2 illustrate the conventional manner of processing an incoming Ethernet packet in this system. The Ethernet packet is received by Ethernet interface 5 and passed over the PCI and memory buses 12, 13 to memory 14 (step 20), where it is stored until it can be processed by the CPU 15. When the CPU is ready to process the Ethernet packet it is passed over the memory bus to the cache 16 of the CPU. (Step 21). The CPU processes the packet to perform protocol processing and re-encapsulate the data for transmission over Fibrechannel. The Fibrechannel packet is then passed over the memory bus and the PCI bus to the Fibrechannel interface 4 (step 22), from which it is transmitted. It will be appreciated that this process involves passing the entire Ethernet packet three times over the memory bus 13. These bus traversals slow down the bridging process.

It would be possible to pass the Ethernet packet directly from the Ethernet interface 5 to the CPU, without it first being stored in memory. However, this would require the CPU to signal the Ethernet hardware to tell it to pass the packet, or alternatively for the CPU and the Ethernet hardware to be synchronised, which would be inefficient and could also lead to poor cache performance. In any event, this is not readily possible in current server chipsets.

Figure 4:
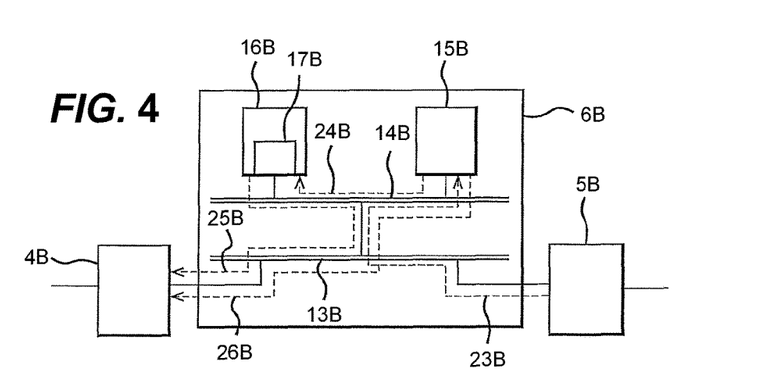
FIG. 4 shows the architecture of the bridge of FIG. 1, illustrating alternative data transfer steps.

An alternative process is illustrated in FIG. 4. FIG. 4 is analogous to FIG. 2 but shows different process steps. In step 23 the received Ethernet packet is passed from the Ethernet hardware to the memory 14. When the CPU is ready to process the packet only the header data is passed to the CPU. (Step 24). The CPU process the header data, forms a Fibrechannel header and transmits the Fibrechannel header to the Fibrechannel interface. (Step 25). Then the traffic data 34 is passed to the Fibrechannel hardware (step 26), which mates it with the received header to form a Fibrechannel packet for transmission. This method has the advantage that the traffic data 34 traverses the memory bus only twice. However, this method is not straightforward to implement, since the CPU must be capable of arranging for the traffic data to be passed from the memory 14 to the Fibrechannel hardware in step 26. This is problematic because the CPU would conventionally have received only the headers for that packet, without any indication of where the packet was located in memory, and so it would have no knowledge of where the traffic data is located in the memory. As a result, the CPU would be unable to inform the bridging entity that is to transmit that data onwards of what data is to be transmitted. Furthermore, if that transmitting entity is to be implemented in software then it could be implemented at user level, for example as an application, or as part of the operating system kernel. If it is implemented at user level then it would not conventionally be able to access physical memory addresses, being restricted instead to accessing memory via virtual memory addresses. As a result, it could not access the packet data in memory directly via a physical address. Alternatively, if the transmitting entity is implemented in the kernel then for software abstraction and engineering reasons it would be preferable for it to interface with the network at a high level of abstraction, for instance by way of a sockets API (application programming interface). As a result, it would be preferred that it does not access the packet data in memory directly via a physical address.

One way of addressing this problem is to permit the Ethernet hardware 5 to access the memory 14 by RDMA (remote direct memory access), and for the Ethernet hardware to be allocated named buffers in the memory. Then the Ethernet hardware can write the traffic data of each packet to a specific named buffer and through the RDMA interface with the bridging application (e.g. uDAPL) indicate to the application the location/identity of the buffer which has received data. The CPU can access the data by means of reading the buffer, for example by means of a post( ) instruction having as its operand the name of the buffer that is to be read. The Fibrechannel hardware can then be passed a reference to the named buffer by the application and so (also by RDMA) read the data from the named buffer. The buffer remains allocated to the Ethernet hardware during the reading step(s).

One problem with this approach is that it requires the Ethernet hardware to be capable of accessing the memory 14 by RDMA, and to include functionality that can handle the named buffer protocol. If the Ethernet hardware is not compatible with RDMA or with the named buffer protocol, or if the remainder of the system is not configured to communicated with the Ethernet hardware by RDMA then this method cannot be used. Also, RDMA typically involves performance overheads.

Analogous problems arise when bridging in the opposite direction: from Fibrechannel to ISCSI, and when using other protocols.

There is therefore a need to improve the processing of data units in bridging situations.

SUMMARY

According to one aspect of the present invention there is provided a method for bridging between a first data link carrying data units of a first data protocol and a second data link for carrying data units of a second protocol by means of a bridging device, the first and second protocols being such that data units of each protocol include protocol data and traffic data and the bridging device comprising a first interface entity for interfacing with the first data link, a second interface entity for interfacing with the second data link, a protocol processing entity and a memory accessible by the first interface entity, the second interface entity and the protocol processing entity, the method comprising: receiving by means of the first interface entity data units of the first protocol, and storing those data units in the memory; accessing by means of the protocol processing entity the protocol data of data units stored in the memory and thereby performing protocol processing for those data units under the first protocol; and accessing by means of the second interface entity the traffic data of data units stored in the memory and thereby transmitting that traffic data over the second data link in data units of the second data protocol.

According to a second aspect of the present invention there is provided a bridging device for bridging between a first data link carrying data units of a first data protocol and a second data link for carrying data units of a second protocol, the first and second protocols being such that data units of each protocol include protocol data and traffic data and the bridging device comprising: a first interface entity for interfacing with the first data link, a second interface entity for interfacing with the second data link, a protocol processing entity and a memory accessible by the first interface entity, the second interface entity and the protocol processing entity; the first interface entity being arranged to receive data units of the first protocol, and storing those data units in the memory; the protocol processing entity being arranged to access the protocol data of data units stored in the memory and thereby perform protocol processing for those data units under the first protocol; and the second interface entity being arranged to access the traffic data of data units stored in the memory and thereby transmit that traffic data over the second data link in data units of the second data protocol.

According to a third aspect of the present invention there is provided a data processing system comprising: a memory comprising a plurality of buffer regions; an operating system for supporting processing entities running on the data processing system and for restricting access to the buffer regions to one or more entities; a first interface entity running on the data processing system whereby a first hardware device may communicate with the buffer regions; and an application entity running on the data processing system; the first interface entity and the application entity being configured to, in respect of a buffer region to which the operating system permits access by both the interface entity and the application entity, communicate ownership data so as to indicate which of the first interface entity and the application entity may access the buffer region and to access the buffer region only in accordance with the ownership data.

According to a fourth aspect of the present invention there is provided a method for operating a data processing system comprising: a memory comprising a plurality of buffer regions; an operating system for supporting processing entities running on the data processing system and for restricting access to the buffer regions to one or more entities; a first interface entity running on the data processing system whereby a first hardware device may communicate with the buffer regions; and an application entity running on the data processing system; the method comprising, in respect of a buffer region to which the operating system permits access by both the interface entity and the application entity, communicating ownership data by means of the first interface entity and the application entity so as to indicate which of the first interface entity and the application entity may access the buffer region and to access the buffer region only in accordance with the ownership data.

According to a fifth aspect of the present invention there is provided a protocol processing entity for operation in a bridging device for bridging between a first data link carrying data units of a first data protocol and a second data link for carrying data units of a second protocol by means of a bridging device, the first and second protocols being such that data units of each protocol include protocol data and traffic data and the protocol processing entity being arranged to cause a processor of the bridging device to perform protocol processing for data units stored in the memory without it accessing the traffic data of those units stored in the memory. The protocol processing entity may be implemented in software. The software may be stored on a data carrier.

The protocol processing entity may be arranged to perform protocol processing for the data units stored in the memory without it accessing the traffic data of those units stored in the memory.

The first protocol may be such that protocol data of a data unit of the first protocol includes check data that is a function of the traffic data of the data unit. The method may then comprise: applying the function by means of the first entity to the content of a data unit of the first protocol received by the first interface entity to calculate first check data; transmitting the first check data to the protocol processing entity; and comparing by means of the protocol processing entity the first check data calculated for a data unit with the check data included in the protocol data of that data unit.

The memory may comprise a plurality of buffer regions. The first interface entity, the second interface entity and the protocol processing entity may each be arranged to access a buffer region only when they have control of it. The method may then comprise: the first interface entity storing a received data unit of the first protocol in a buffer of which it has control and subsequently passing control of that buffer to the protocol processing entity; the protocol processing entity passing control of a buffer to the second interface entity when it has performed protocol processing of the or each data unit stored in that buffer; and the second interface entity passing control of a buffer to the first interface entity when it has transmitting the traffic data contained in that buffer over the second data link in data units of the second data protocol.

The method may comprise: generating by means of the protocol processing entity protocol data of the second protocol for the data units to be transmitted under the second protocol; communicating that protocol data to the second interface entity; and the second interface entity including that protocol data in the said data units of the second protocol.

The second protocol may be such that protocol data of a data unit of the second protocol includes check data that is a function of the traffic data of the data unit. The method may then comprise: applying the function by means of the second interface entity to the content of a data unit of the second protocol to be transmitted by the second interface entity to calculate first check data; combining that check data with protocol data received from the protocol processing entity to form second protocol data; and the second interface entity including the second protocol data in the said data units of the second protocol.

One of the first and second protocols may be TCP. One of the first and second protocols may be Fibrechannel. The first and second protocols may be the same.

The first and second interface entities may each communicate with the respective data link via a respective hardware interface.

The first and second interface entities may each communicate with the respective data link via the same hardware interface.

The protocol processing may comprise terminating a link of the first protocol.

The protocol processing may comprise: inspecting the traffic data of the first protocol; comparing the traffic data of the first protocol with one or more pre-set rules; and if the traffic data does not satisfy the rules preventing that traffic data from being transmitted by the second interface entity.

The data processing system may comprise a second interface entity running on the data processing system whereby a second hardware device may communicate with the buffer regions. The first and second interface entities and the application entity may be configured to, in respect of a buffer region to which the operating system permits access by the first and second interface entities and the application entity, communicate ownership data so as to indicate which of the first and second interface entities and the application entity may access each buffer regions and to access each buffer region only in accordance with the ownership data.

The first interface entity may be arranged to, on receiving a data unit, store that data unit in a buffer region that it may access in accordance with the ownership data and to subsequently modify the ownership data such that the application entity may access that buffer region in accordance with the ownership data. The application entity may be arranged to perform protocol processing on data unit(s) stored in a buffer region that it may access in accordance with the ownership data and to subsequently modify the ownership data such that the second interface entity may access that buffer region in accordance with the ownership data. The second interface entity may be arranged to transmit at least some of the content of data unit(s) stored in a buffer region that it may access in accordance with the ownership data and to subsequently modify the ownership data such that the application entity may access that buffer region in accordance with the ownership data.

BRIEF DESCRIPTION OF THE DRAWINGS

The present invention will now be described by way of example with reference to the accompanying drawings. In the drawings.

DETAILED DESCRIPTION OF THE INVENTION

In the bridging device described below, data units of a first protocol are received by interface hardware and written to one or more receive buffers. In the example described below, those data units are TCP packets which encapsulate ISCSI packets. The TCP and ISCSI header data is then passed to the entity that performs protocol processing. The header data is passed to that entity without the traffic data of the packets, but with information that identifies the location of the traffic data within the buffer(s). The protocol processing entity performs TCP and ISCSI protocol processing. If protocol processing is successful then it also passes the data identifying the location of the traffic data in the buffers to an interface that will be used for transmitting the outgoing packets. The interface can then read that data, form one or more headers for transmitting it as data units of a second protocol, and transmit it. In bridging between the data links that carry the packets of the respective protocols, the bridging device receives data units of one protocol and transmits data units of another protocol which include the traffic data contained in the received data units.

Figure 5:
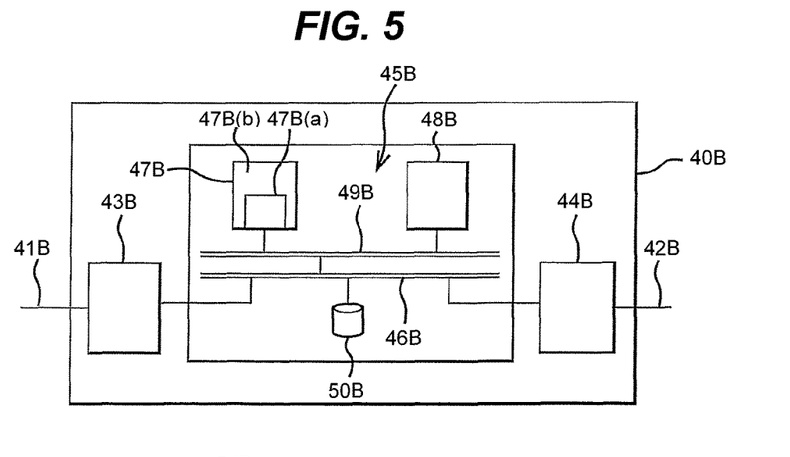
FIG. 5 illustrates the physical architecture of a bridging device.

FIG. 5 shows the physical architecture of a device 40 for bridging between an ISCSI-over-Ethernet data link 41 and a Fibrechannel data link 42. The device comprises an Ethernet hardware interface 43, a Fibrechannel hardware interface 44 and a central processing section 45. The hardware interfaces link the respective data links to the central processing section 45 via a bus 46, which could be a PCI bus. The central processing section comprises a CPU 47, which includes a cache 47a and a processing section 47b, and random access memory 48 which are linked by a memory bus 49 to the PCI bus. A non-volatile storage device 50, such as a hard disc, stores program code for execution by the CPU.

Figure 6:
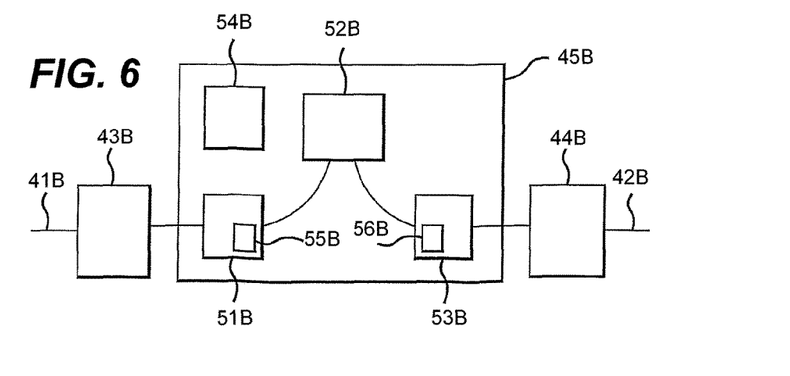
FIG. 6 illustrates the logical architecture of the bridging device of FIG. 5.

FIG. 6 shows the logical architecture provided by the central processing section 45 of the bridging device 40. The CPU provides four main logical functions: an Ethernet transport library 51, a bridging application 52, a Fibrechannel transport library 53 and an operating system kernel 54. The transport libraries, the bridging application and the operating system are implemented in software which is executed by the CPU. The general principles of operation of such systems are discussed in WO 2004/025477.

Areas of the memory 48 are allocated for use as buffers 55, 56. These buffers are configured in such a way that the interface that receives the incoming data can write to them, the bridging application can read from them, and the interface that transmits the outgoing data can read from them. This may be achieved in a number of ways. In a system that is configured not to police memory access any buffer may be accessible in this way. In other operating systems they may be set up as anonymous memory: i.e. memory that is not mapped to a specific process; so that they can be freely accessed by both interfaces. Another approach is to implement a further process, or a set of instructions calls, or an API that is able to act as an intermediary to access the buffers on behalf of the interfaces.

The present example will be described with reference to a system in which the operating system allocates memory resources to specific processes and restricts other processes from accessing those resources. The transport libraries 51, 53 and the bridging application 52 are implemented in a single process, by virtue of them occupying a common instruction space. As a result, a buffer allocated to any of those three entities can be accessible to the other two. (Under a normal operating system (OS), OS-allocated buffers are only accessible if the OS chooses for them to be). The interfaces 43, 44 should be capable of writing to and reading from the buffers. This can be achieved in a number of ways. For example, each transport libraries may implement an API through which the respective interface can access the buffers. Alternatively, the interface could interact directly with the operating system to access the buffers. This may be convenient where, in an alternative embodiment, one of the transport libraries is implemented as part of the operating system and derives its ability to access the buffers through its integration with the operating system rather than its sharing of an instruction space with the bridging application.

Each buffer is identifiable by a handle that acts as a virtual reference to the buffer. The handle is issued by the operating system when the buffer is allocated. An entity wishing to read from the buffer can issue a read call to the operating system identifying the buffer by the handle, in response to which the operating system will return the content of the buffer or the part of buffer cited in the read call. An entity wishing to write to the buffer can issue a write call to the operating system identifying the buffer by the handle, in response to which the operating system will write data supplied with the call to the buffer or to the part of buffer cited in the write call. As a result, the buffers need not be referenced by a physical address, and can hence be accessed by user-level entities under operating systems that limit the access of user-level entities to physical memory.

The transport libraries and the bridging application implement a protocol to allow them to cooperatively access the buffers that are allocated to the instruction space that they share. In this protocol each of those entities maintains an "owned buffer" list of the buffers that it has responsibility for. Each entity is arranged to access only those buffers currently included in its owned buffer list. Each entity can pass a "handover" message to one of the other entities. The handover message includes the handle of a buffer. On transmitting the handover message (or alternatively on acknowledgement of the handover message), the entity that transmitted the handover message deletes the buffer mentioned in the message from its owned buffer list. On receipt of a handover message an entity adds the buffer mentioned in the message to its owned buffer list. This process allows the entities to cooperatively assign control of each buffer between each other, independently of the operating system. The entity whose owned buffer list includes a buffer is also responsible for the administration of that buffer: for example for returning the buffer to the operating system when it is no longer required. Buffers that are subject to this protocol will be termed "anonymous buffers" since the operating system does not discriminate between the entities of the common instruction space in policing access to those buffers.

The operation of the device for bridging packets from the Ethernet interface to the Fibrechannel interface will now be explained. The device operates in an analogous way to bridge packets in the opposite direction.

At the start of operations the bridging application 52 requests the operating system 54 to allocate blocks of memory for use by the bridging system as buffers 55. The operating system allocates a set of buffers accordingly and passes handles to them to the application. These buffers can then be accessed directly by the bridging application and the transport libraries, and can be accessed by the interfaces by means of the anonymous APIs implemented by the respective transport libraries.

One or more of the buffers are passed to the incoming transport library 51 by means of one or more handover messages. The transport library adds those buffers to its owned buffer list. The transport library maintains a data structure that permits it to identify which of those buffers contains unprocessed packets. This may be done by queuing the buffers or by storing a flag indicating whether each buffer is in use. On being passed a buffer the incoming transport library notes that buffer as being free. The data structure preferably indicates the order in which the packets were received, in order that that information can be used to help prioritise their subsequent processing. Multiple packets could be stored in each buffer, and a data structure maintained by the Ethernet transport library to indicate the location of each packet.

Figure 7:
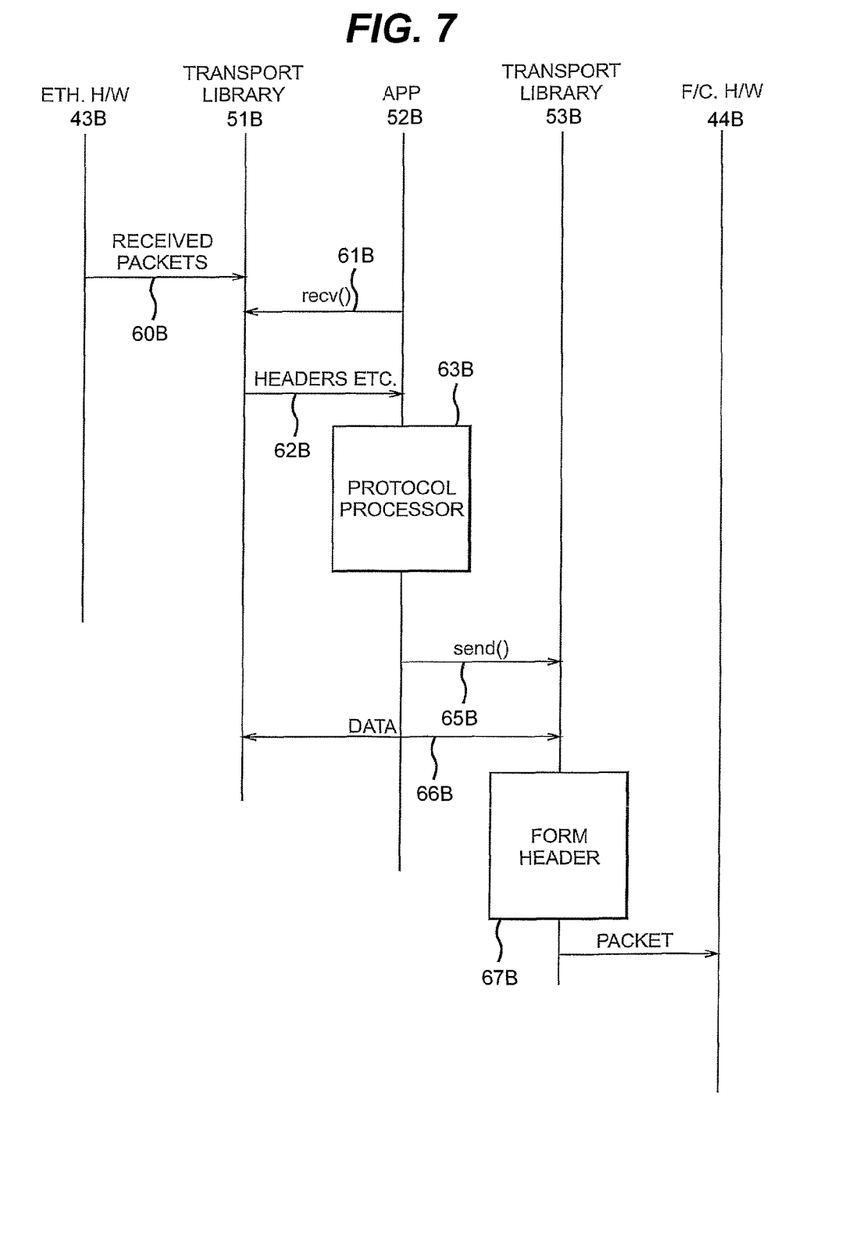
FIG. 7 shows the processing of data in the bridging device of FIG. 5.

Referring to FIG. 7, as Ethernet packets are received Ethernet protocol processing is performed by the Ethernet interface hardware 43, and the Ethernet headers are removed from the Ethernet packets, leaving TCP packets in which ISCSI packets are encapsulated. Each of these packets is written by the Ethernet hardware into one of the buffers 55. (Step 60). This is achieved by the Ethernet hardware issuing a buffer write call to the API of the Ethernet transport library, with the TCP packet as an operand. In response to this call the transport library identifies a buffer that is included in its owned buffer list and that is free to receive a packet. It stores the received packet in that buffer and then modifies its data structure to mark the buffer as being occupied.

Thus, at least some of the protocol processing that is to be performed on the packet can be performed by the interface (43, in this example) that received the incoming packet data. This is especially efficient if that interface includes dedicated hardware for performing that function. Such hardware can also be used in protocol processing for non-bridged packets: for example packets sent to the bridge and that are to terminate there. One example of such a situation is when an administrator is transmitting data to control the bridging device remotely. The interface that receives the incoming packet data has access to both the header and the traffic data of the packet. As a result, it can readily perform protocol processing operations that require knowledge of the traffic data in addition to the header data. Examples of these operations include verifying checksum data, CRC (cyclic redundancy check) data or bit-count data. In addition to Ethernet protocol processing the hardware could conveniently perform TCP protocol processing of received packets.

The application 52 runs continually. Periodically it makes a call, which may for example be "recv( )" or "complete( )" to the transport library 51 to initiate the protocol processing of any Ethernet packet that is waiting in one of the buffers 55. (Step 61). The recv( )/complete( ) call does not specify any buffer. In response to the recv( )/complete( ) call the transport library 51 checks its data structure to find whether any of the buffers 55 contain unprocessed packets. Preferably the transport library identifies the buffer that contains the earliest-received packet that is still unprocessed, or if the buffer is capable of prioritising certain traffic then it may bias its identification of a packet based on that prioritisation. If an unprocessed packet has been identified then the transport library responds to the recv( )/complete( ) call by returning a response message to the application (step 62), which includes:

- the TCP and ISCSI headers of the identified packet, which may collectively be considered to constitute a header or header data of the packet;
- the handle of the buffer in which the identified packet is stored;
- the start point within that buffer of the traffic data block of the packet; and
- the length of the traffic data block of the packet.

By means of the headers the application can perform protocol processing on the received packet. The other data collectively identifies the location of the traffic data for the packet. The response message including a buffer handle is treated by the incoming transport library and the bridging application as handing that buffer over to the bridging application. The incoming transport library deletes that buffer handle from its owned buffer list as one of the buffers 55, and the bridging application adds the handle to its owned buffer list.

It will be noted that by this message the application has received the header of the packet and a handle to the traffic data of the packet. However, the traffic data itself has not been transferred. The application can now perform protocol processing on the header data.

The protocol processing that is to be performed by the application may involve functions that are to be performed on the traffic data of the packet. For example, ISCSI headers include a CRC field, which needs to be verified over the traffic data. Since the application does not have access to the traffic data it cannot straightforwardly perform this processing. Several options are available. First, the application could assume that that CRC (or other such error-check data) is correct. This may be a useful option if the data is delay-critical and need not anyway be re-transmitted, or if error checking is being performed in a lower-level protocol. Another option is for the interface to calculate the error-check data over the relevant portion of the received packet and to store it in the buffer together with the packet. The error check data can then be passed to the application in the response message detailed above, and the application can simply verify whether that data matches the data that is included in the header. This requires the interface to be capable of identifying data of the relevant higher-level protocol (e.g. ISCSI) embedded in received packets of a lower-level protocol (e.g. Ethernet or TCP), and to be capable of executing the error-check algorithm appropriate to that higher-level data. Thus, in this approach the execution of the error-check algorithm is performed by a different entity from that which carries out the remainder of the protocol processing, and by a different entity from that which verifies the error-check data.

Not all of the headers of the packet as received at the hardware interface need be passed in the response message that is sent to the application, or even stored in the buffer. If protocol processing for one or more protocols is performed at the interface then the headers for those protocols can be omitted from the response and not stored in the buffer. However, it may still be useful for the application to receive the headers of one or more protocols for which the application does not perform protocol processing. One reason for this is that it provides a way of allow the application to calculate the outgoing route. The outgoing route could be determined by the Fibrechannel transport library 53 making use of system-wide route tables that could, for example, be maintained by the operating system. The Fibrechannel transport library 53 can look up a destination address in the route tables so as to resolve it to the appropriate outgoing FC interface.

The application is configured in advance to perform protocol processing on one or more protocol levels. The levels that are to be protocol processed by the application will depend on the bridging circumstances. The application is configured to be capable of performing such protocol processing in accordance with the specifications for the protocol(s) in question. In the present example the application performs protocol processing on the ISCSI header. (Step 63).

Having performed protocol processing on the header as received from the incoming transport library, the application then passes a send( ) command to the Fibrechannel transport library (step 65). The send( ) command includes as an operand the handle of the buffer that includes the packet in question. It may also include data that specifies the location of the traffic data in the buffer, for example the start point and length of the traffic data block of the packet. The send( ) command is interpreted by the buffering application and by the outgoing transport library as handing over that buffer to the outgoing transport library. Accordingly, the bridging application deletes that buffer handle from its owned buffer list, and the outgoing transport library adds the handle to its owned buffer list, as one of the buffers 56.

The Fibrechannel transport library then reads the header data from that buffer (step 66) and using the header alone (i.e. without receiving the traffic data stored in the buffer) it forms a Fibrechannel header for onward transmission of the corresponding traffic data (step 67).

The Fiberchannel transport library then provides that header and the traffic data to the Fibrechannel interface, which combines them into a packet for transmission (step 68). The header and the traffic data could be provided to the Fiberchannel interface in a number of ways. For example, the header could be written into the buffer and the start location and length of the header and the traffic data could be passed to the Fiberchannel interface. Conveniently the header could be written to the buffer immediately before the traffic data, so that only one set of start location and length data needs to be transmitted. If the outgoing header or header set is longer than the incoming header or header set this may require the incoming interface to write the data to the buffer in such a way as to leave sufficient free space before the traffic data to accommodate the outgoing header. The Fiberchannel interface could then read the data from the buffer, for example by DMA (direct memory access). Alternatively, the header could be transmitted to the Fiberchannel interface together with the start location and length of the traffic data and the interface could then read the traffic data, by means of an API call to the transport library, and combine the two together. Alternatively, both the header and the traffic data could be transmitted to the Fiberchannel interface. The header and the start/length data could be provided to the Fiberchannel interface by being written to a queue stored in a predefined set of memory locations, which is polled periodically by the interface.

The outgoing header might have to include calculated data, such as CRCs, that is to be calculated as a function of the traffic data. In this situation the header as formed by the transport library can include space (e.g. as zero bits) for receiving that calculated data. The outgoing hardware interface can then calculate the calculated data and insert it into the appropriate location in the header. This avoids the outgoing transport library having to access the traffic data.

Once the Fibrechannel packet has been transmitted for a particular incoming packet the buffer in which the incoming packed had been stored can be re-used. The Fibrechannel transport library hands over ownership of the buffer to the Ethernet transport library. Accordingly, the Fiberchannel transport library deletes that buffer handle from its owned buffer list, and the Ethernet transport library adds the handle to its owned buffer list, marking the buffer as free for storage of an incoming packet.

As indicated above, the buffers in which the packets are stored are implemented as anonymous buffers. When a packet is received the buffer that is to hold that packet is owned by the incoming hardware and/or the incoming transport library. When the packet comes to be processed by the bridging application ownership of the buffer is transferred to the bridging application. Then when the packet comes to be transmitted ownership of the buffer is transferred to the outgoing hardware and/or the outgoing transport library. Once the packet has been transmitted ownership of the buffer can be returned to the incoming hardware and/or the incoming transport library. In this way the buffers can be used efficiently, and without problems of access control. The use of anonymous buffers avoids the need for the various entities to have to support named buffers. This is especially significant in the case of the incoming and outgoing hardware since it may not be possible to modify pre-existing hardware to support named buffers. It may also not be economically viable to use such hardware since it requires significant additional complexity—namely the ability to fully perform complex protocol processing e.g. to support TCP and RDMA (iWARP) protocol processing. This would in practice require a powerful CPU to be embedded in the hardware, which would make the hardware excessively expensive.

Once each layer of protocol processing is completed for a packet the portion of the packet's header that relates to that protocol is no longer required. As a result, the memory in which that portion of header was stored can be used to store other data structures. This will be described in more detail below.

When a packet is received the incoming hardware and/or transport library should have one or more buffers in its ownership. It selects one of those buffers for writing the packet to. That buffer may include one or more other received packets, in which case the hardware/library selects suitable free space in the buffer for accommodating the newly received packet. Preferably it attempts to pack the available space efficiently. There are various ways to aim at this: one is to find a space in a buffer that most closely matches the size of the received packet, whilst not being smaller than the received packet. The space in the buffer may be managed by a data structure stored in the buffer itself which provides pointers to the start and end of the packets stored in the buffer. If the buffer includes multiple packets then ownership of the buffer is passed to the application when any of those is to be protocol processed by the application. When the packet has been transmitted the remaining packets in the buffer remain unchanged but the data structure is updated to show the space formerly occupied by the packet as being vacant.

If the TCP and ISCSI protocol processing is unsuccessful then the traffic data of the packet may be dropped. The data need not be deleted from the buffer: instead the anonymous buffer handle can simply passed back to the Ethernet transport library for reuse.

This mechanism has the consequence that the traffic data needs to pass only twice over the memory bus: once from the Ethernet hardware to memory and once from memory to the Fibrechannel hardware. It does not need to pass through the CPU; in particular it does not need to pass through the cache of the CPU. The same approach could be used for other protocols; it is not limited to bridging between Ethernet and Fibrechannel.

The transport libraries and the application can run at user level. This can improve reliability and efficiency over prior approaches in which protocol processing is performed by the operating system. Reliability is improved because the machine can continue in operation even if a user-level process fails.

The transport libraries and the application are configured programmatically so that if their ownership list does not include the identification of a particular buffer they will not access that buffer.

If the machine is running other applications in other address spaces then the named buffers for one application are not accessible to the others. This feature provides for isolation between applications and system integrity. This is enforced by the operating system in the normal manner of protecting applications' memory spaces.

The received data can be delivered directly from the hardware to the ISCSI stack, which is constituted by the Ethernet transport library and the application operating in cooperation with each other. This avoids the need for buffering received data on the hardware, and for transmitting the data via the operating system as in some prior implementations.

The trigger for the passing of data from the buffers to the CPU is the polling of the transport library at step 61. The polling can be triggered by an event sent by the Ethernet hardware to the application on receipt of data, a timer controlled by the application, by a command from a higher level process or from a user, or in response to a condition in the bridging device such as the CPU running out of headers to process. This approach means that there is no need for the protocol processing to be triggered by an interrupt when data arrives. This economises on the use of interrupts.

The bridging device may be implemented on a conventional personal computer or server. The hardware interfaces could be provided as network interface cards (NICs) which could each be peripheral devices or built into the computer. For example, the NICs could be provided as integrated circuits on the computer's motherboard.

When multiple packets have been received the operations in FIG. 7 can be combined for multiple packets. For example, the response data (at step 62) for multiple packets can be passed to the CPU and stored in the CPU's cache awaiting processing.

There may be limitations on the size of the outgoing packets that mean that the traffic data of an incoming packet cannot be contained in a single outgoing packet. In that case the traffic data can be contained in two or more outgoing packets, each of whose headers is generated by the transport library of the outgoing protocol.

Since the packets are written to contiguous blocks of free space in the buffers 54, as packets get removed from the buffers 54 gaps can appear in the stream of data in the buffers. If the received packets are of different lengths then those gaps might not be completely filled by new received data. As a result the buffers can become fragmented, and therefore inefficiently utilised. To mitigate this, as soon as the header of a received packet has been passed to the CPU for processing the space occupied by that header can be freed up immediately. That space can be used to allow a larger packet to be received in a gap in memory preceding that header. Alternatively that space can be used for various data constructs. For example, it can be used to store a linked-list data structure that allows packets to be stored discontiguously in the buffer. Alternatively, it could be used to store the data structure that indicates the location of each packet and the order in which it was received. Fragmentation may also be reduced by performing a defragmentation operation on the content of a buffer, or by moving packets whose headers have not been passed to the CPU for processing from one buffer to another. One preferred fragmentation algorithm is to check from time to time for buffers that contain less data than a pre-set threshold level. The data in such a buffer is moved out to another buffer, and the data structure that indicates which packet is where is updated accordingly.

In a typical architecture, when the Ethernet packet headers are read to the CPU for processing by the bridging application they will normally be stored in a cache of the CPU. The headers will then be marked as "dirty" data. Therefore, in normal circumstances they would be flushed out of the cache and written back to the buffer so as to preserve the integrity of that memory. However, once the headers have been processed by the bridging application they are not needed any more, and so writing them back to the buffer is wasteful. Therefore, efficiency can be increased by taking measures to prevent the CPU from writing the headers back to memory. One way to achieve this is by using an instruction such as the wbinv (write-back invalidate) instruction which is available on some architectures. This instruction can be used in respect of the header data stored in the cache to prevent the bridging application from writing that dirty data back to the memory. The instruction can conveniently be invoked by the bridging application on header data that is stored in the cache when it completes processing of that header data. At the same point, it can arrange for the space in the buffer(s) that was occupied by that header data to be marked as free for use, for instance by updating the data directory that indicates the buffer contents.

The principles described above can be used for bridging in the opposite direction: from Fibrechannel to ISCSI, and when using other protocols. Thus the references herein to Ethernet and Fibrechannel can be substituted for references to other incoming and outgoing protocols respectively. They could also be used for bridging between links that use two identical protocols. In the apparatus of FIG. 5 the software could be configured to permit concurrent bridging in both directions. If the protocols are capable of being operated over a common data link then the same interface hardware could be used to provide the interface for incoming and for outgoing packets.

The anonymous buffer mechanism described above could be used in applications other than bridging. In general it can be advantageous wherever multiple devices that have their own processing capabilities are to process data units in a buffer, and where one of those devices is to carry out processing on only a part of each data unit. In such situations the anonymous buffer mechanism allows the devices or their interfaces to the buffer to cooperates so that the entirety of each data unit need not pass excessively through the system. One examples of such an application is a firewall in which a network card is to provide data units to an application that is to inspect the header of each data unit and in dependence on that header either block or pass the data unit. In that situation, the processor would not need to terminate a link of the incoming protocol to perform the required processing: it could simply inspect incoming packets, compare them with pre-stored rules and allow them to pass only if they satisfy the rules. Another example is a tape backup application where data is being received by a computer over a network, written to a buffer and then passed to a tape drive interface for storage. Another example is a billing system for a telecommunications network, in which a network device inspects the headers of packets in order to update billing records for subscribers based on the amount or type of traffic passing to or from them.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed:

1. A method for bridging between a first data link carrying data units in accordance with a first data protocol and a second data link for carrying data units in accordance with a second protocol by a bridging device, the first and second protocols being such that data units in accordance with each protocol include protocol data and traffic data and the bridging device comprising one or more processors configured to provide a first interface entity for interfacing with the first data link, a second interface entity for interfacing with the second data link, and a protocol processing entity, the bridging device further comprising a memory having a plurality of buffer regions accessible by the first interface entity, the second interface entity and the protocol processing entity, the method comprising:
   receiving at the first interface entity data units in accordance with the first protocol, and storing at least the traffic data of those data units in a first memory buffer region;
   receiving a call from the protocol processing entity, at the first interface entity, and returning in response thereto a message comprising a reference to the first memory buffer region and at least some protocol data, control of said first memory buffer region being handed over to said protocol processing entity;
   performing, in response to said message, by the protocol processing entity, protocol processing for those data units, control of said first memory buffer region being handed over to said second interface entity; and
   accessing by the second interface entity the traffic data of data units stored in the memory buffer and thereby transmitting that traffic data over the second data link in data units in accordance with the second data protocol.

2. A method as claimed in claim 1, wherein the protocol processing entity is arranged to perform protocol processing for the data units stored in a memory buffer without it accessing the traffic data of those units stored in said memory buffer.

3. A method as claimed in claim 2, wherein the first protocol is such that protocol data of a data unit of the first protocol includes check data that is a function of the traffic data of the data unit, and the method comprises:
applying the function by the first interface entity to the content of a data unit of the first protocol received by the first interface entity to calculate first check data;
transmitting the first check data to the protocol processing entity; and
comparing by the protocol processing entity the first check data calculated for a data unit with the check data included in the protocol data of that data unit.

4. A method as claimed in claim 1, wherein:
the first interface entity, the second interface entity and the protocol processing entity are each arranged to access a buffer region only when they have control of it; and the method comprises:
the first interface entity storing a received data unit of the first protocol in a buffer of which it has control and subsequently passing control of that buffer to the protocol processing entity;
the protocol processing entity passing control of a buffer to the second interface entity when it has performed protocol processing of the data unit stored in that buffer; and
the second interface entity passing control of a buffer to the first interface entity when it has transmitted the traffic data contained in that buffer over the second data link in data units in accordance with the second data protocol.

5. A method as claimed in claim 1, comprising:
generating by the protocol processing entity protocol data of the second protocol for the data units to be transmitted under the second protocol;
communicating the protocol data of the second protocol to the second interface entity; and
the second interface entity including the protocol data of the second protocol in the said data units in accordance with the second protocol.

6. A method as claimed in claim 5, wherein the second protocol is such that protocol data of a data unit of the second protocol includes check data that is a function of the traffic data of the data unit, and the method comprises:
applying the function by the second interface entity to the content of a data unit of the second protocol to be transmitted by the second interface entity to calculate first check data;
combining the first check data with protocol data received from the protocol processing entity to form second protocol data; and
the second interface entity including the second protocol data in the said data units in accordance with the second protocol.

7. A method as claimed in claim 1, wherein one of the first and second protocols is TCP.

8. A method as claimed in claim 1, wherein one of the first and second protocols is Fibrechannel.

9. A method as claimed in claim 1, wherein the first and second protocols are the same.

10. A method as claimed in claim 1, wherein the first and second interface entities each communicate with the respective data link via a respective hardware interface.

11. A method as claimed in claim 1, wherein the first and second interface entities each communicate with the respective data link via the same hardware interface.

12. A method as claimed in claim 1, wherein the protocol processing comprises terminating a link of the first protocol.

13. A method as claimed in claim 1, wherein the protocol processing comprises:
inspecting the traffic data of the first protocol;
comparing the traffic data of the first protocol with one or more pre-set rules; and
if the traffic data does not satisfy the rules preventing that traffic data from being transmitted by the second interface entity.

14. A method as claimed in claim 1, wherein the first interface entity comprises a first transport library, and the second interface entity comprises a second transport library.

15. A method as claimed in claim 1, further comprising:
in response to receiving a message from the protocol processing entity at the second interface entity, processing protocol data to form protocol data of the second protocol.

16. A method as claimed in claim 4, wherein:
each buffer region of said plurality of buffers is identifiable by a virtual reference;
the step of the first interface entity passing control of a buffer to the protocol processing entity comprising passing to the protocol processing entity a virtual reference to that buffer; and
the step of the protocol processing entity passing control of a buffer to the second interface entity comprises passing to the second interface entity a virtual reference to that buffer.

17. A method as claimed in claim 1, further comprising:
the protocol processing entity periodically issuing calls to the first interface entity to initiate protocol processing of data units stored in said first memory buffer region;
the first interface entity, in response to receiving one or more of said calls, returning a response message to the protocol processing entity comprising at least one of:
protocol data of data units stored in the first memory buffer region; and
an indication of the location in the memory of traffic data of data units stored in the first memory buffer region.

18. A method as claimed in claim 1, wherein the one or more processors are configured to provide the first interface entity, second interface entity, and protocol processing entity at user level.

19. A bridging device for bridging between a first data link carrying data units in accordance with a first data protocol and a second data link for carrying data units in accordance with a second protocol, the first and second protocols being such that data units in accordance with each protocol include protocol data and traffic data and the bridging device comprising:
one or more processors configured to provide a first interface entity for interfacing with the first data link, a second interface entity for interfacing with the second data link, and a protocol processing entity;
the first interface entity being arranged to:
receive data units in accordance with the first protocol;
store those data units in a first memory buffer region; and
in response to receipt of a call from the protocol processing entity, return a message thereto comprising a reference to the first memory buffer region and at least some protocol data, control of said first memory buffer region being handed over to said protocol processing entity:
the protocol processing entity being arranged to:
  perform protocol processing for those data units; and
  control of said first memory buffer region being handed over to said second interface entity; and
the second interface entity being arranged to access the traffic data of data units stored in the memory buffer and thereby transmit that traffic data over the second data link in data units in accordance with the second data protocol.

20. A bridging device for bridging between a first data link carrying data units in accordance with a first data protocol and a second data link for carrying data units in accordance with a second protocol, the first and second protocols being such that data units in accordance with each protocol include protocol data and traffic data, the bridging device comprising:
an interface for interfacing with said first data link; and one or more processors configured to provide a protocol processing entity, wherein said interface is configured to perform at least some protocol processing for data units received over the first data link, and respond to at least one message from said protocol processing entity with a reference to a memory buffer region in which one or more data units are stored, control of said memory buffer region being handed over to said protocol processing entity by removing said memory buffer from an owned buffer list of the interface and adding said memory buffer to an owned buffer list of the protocol processing entity, and the protocol processing entity is arranged to cause said one or more processors of the bridging device to perform protocol processing for said data units stored in said memory buffer without accessing the traffic data of those data units stored in said memory buffer.

* * * * *